July 11, 1967     C. H. WEBER     3,330,105
PROTECTIVE DEVICE FOR FLEXIBLE CONDUCTORS
Filed June 23, 1965     3 Sheets-Sheet 1
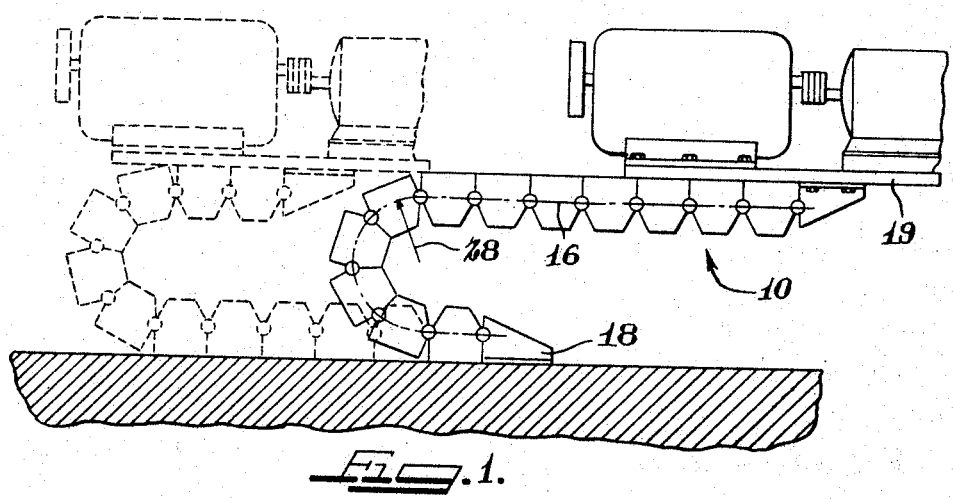
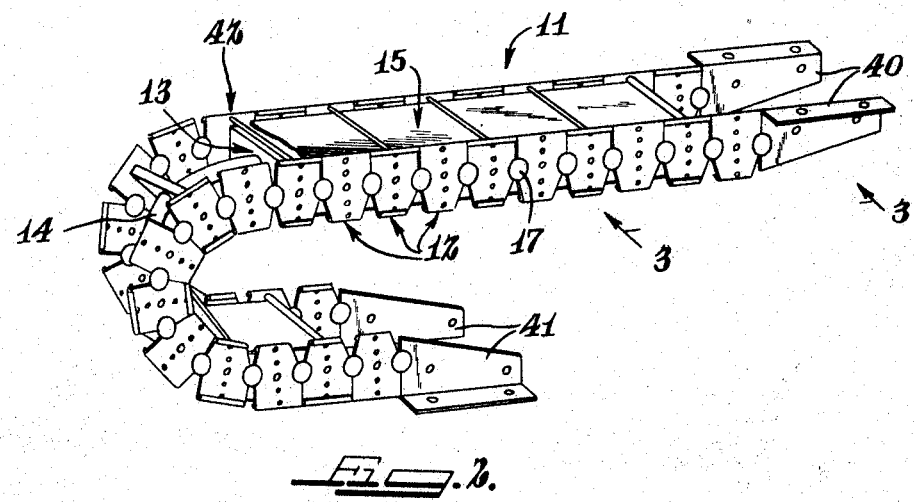
INVENTOR
CHARLES H. WEBER
BY
Horton, Davis, Brewer & Brugman
Attys.

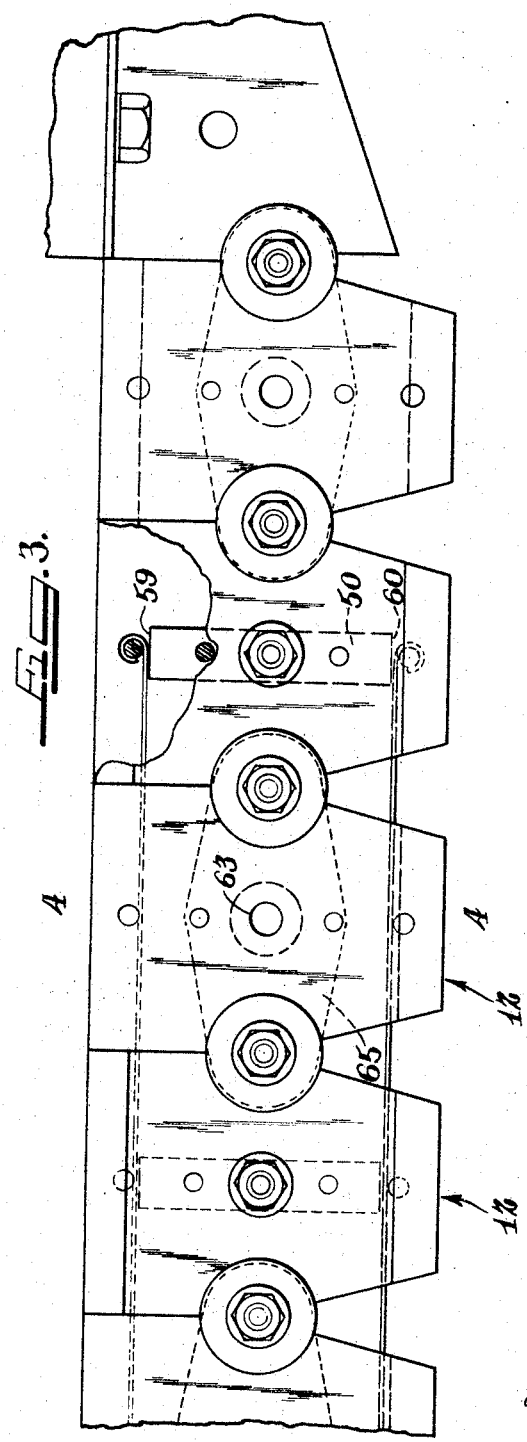
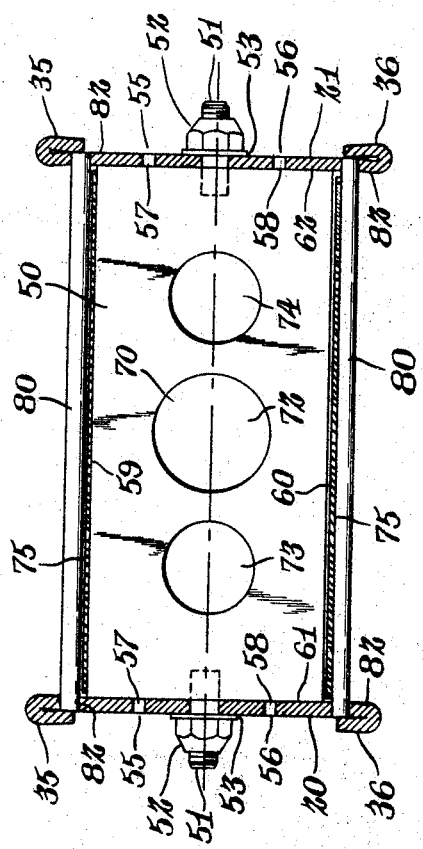

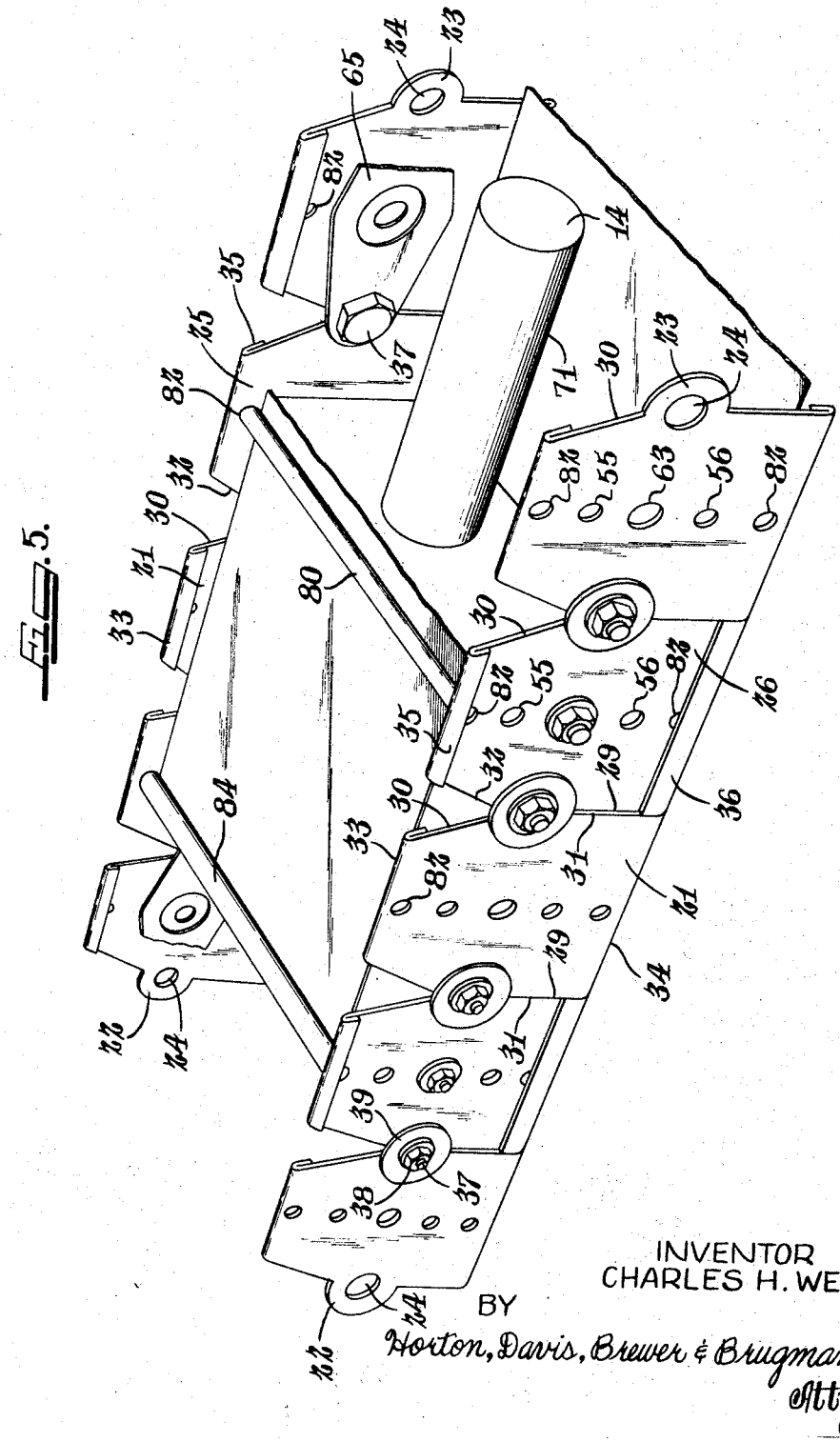

United States Patent Office 3,330,105
Patented July 11, 1967

3,330,105
PROTECTIVE DEVICE FOR FLEXIBLE
CONDUCTORS
Charles H. Weber, Mayville, Wis., assignor to Maysteel
Products Corp., Milwaukee, Wis., a corporation of
Wisconsin
Filed June 23, 1965, Ser. No. 466,248
8 Claims. (Cl. 59—78.1)

This invention relates to articulated conduit systems for supporting flexible conductors between a utility source and movable equipment, and to a protective device to shield conductors so supported from deleterious matter present in the environment in which the system is used.

Numerous classes of machines and devices depend upon relative movement between different elements thereof, and upon movement by the machine itself, for their operation, and in many of these machines and devices utilities such as electrical energy, pressurized gases and liquids and control means must be supplied to the movable element. Thus, in machines such as lathes, shapers, mills and etc., the movable carriages and heads thereof may be supplied with such utilities from terminals on the machine body itself, while machines such as overhead cranes must be supplied from a fixed source. The conductors used to supply these various utilities are flexible and are subjected to bending in order to serve the movable element over its range of operation. Further, conductors having a high degree of flexibility are desirably used for such applications because the movement thereof during operation of the machine is confinable to a limited channel of operation. However, the strength of the material used for a conductor for a given service must also be considered, thus, the material ultimately selected for use as a conductor, or outer conduit, must adequately contain the utility and possess a high degree of flexibility. Such materials as plastics and compositions of rubber satisfy these needs and are widely used for these purposes.

While such materials are relatively flexible they may be so bent that they will rupture; they are subject to wear from abrasion, and they are susceptible to damage when struck by hot materials such as cutting chips. It is thus highly desirable, and indeed necessary to sustain extended use of a conductor, that flexing and bending thereof, when used as described above, be limited to a minimum radius of bending; that the conductor will not be chafed by any means which supports it, and that the conductor be shielded from deleterious materials present in the environment in which the conductors are used.

This invention satisfies the foregoing conditions and leads to other advantages as well. Generally, the invention comprises an articulated chain means arranged to support one and more flexible conductors between a plurality of oppositely disposed parallel plates, which are arranged consecutively in pairs as links. The articulate movement of the several links relative to one another is regulated by limiting means which prevent the chain means from being bent at less than a predetermined radius. This radius is predetermined to provide safe bending for the most critical conductor carried by the chain means. Furthermore, the chain means includes carrier means by which the conductors are supported for movement with the chain means. These are so arranged that the conductors borne thereby are supported in positions at which their neutral axes of bending substantially coincide the axis of articulation of the chain means. Thus, at the point of support, there is almost no relative longitudinal movement between the conductors and the carrier means. The conductors are shielded along open sides of the chain, as defined by the open lateral area between corresponding outer edges of opposing link plates, by protective means which are arranged to cover selected portions thereof and flexibly follow the articulated operation of the chain means. The protective means are borne by the chain means at positions within the physical confines of the chain means and do not interfere with the operation thereof.

It is therefore an important object of this invention to provide an articulated conduit system for supporting flexible conductors and the like between spaced connections, at least one of which is movable and which limits the radius of bending of a supported conductor to a predetermined safe amount.

Another important object of this invention is to provide carrier means operatively associated with the links of an articulated conduit system to support one and more elongated flexible conductors at positions thereon in which the neutral axis of the conductors is maintained substantially coincident with the axis of articulation of the conduit system.

It is also an important object of this invention to provide a flexible shield to cover selected portions of an articulated chain.

Another object of this invention is to provide a protective means for articulated conduit systems as aforesaid which is durable, easily manufactured and composed of inexpensive, readily available materials.

A further object of this invention is to provide a simple guide means to support and guide a flexible member away from conductors supported in an articulated chain conduit system.

Yet another object of this invention is to provide protective shielding means over open portions of articulated chain conduit systems which is borne by the system and positioned within the physical confines thereof.

These and other objects, features and advantages of this invention will become apparent to those familiar with the art from the following description of the best mode presently contemplated for practicing the same, as illustrated in the accompanying drawings.

In the drawings:

FIGURE 1 is a side elevation view illustrating the general arrangement of one type of articulated conduit system according to this invention;

FIGURE 2 is a perspective view of the articulated conduit system illustrated in FIGURE 1 including a partial view of the flexible protective means and the guide means;

FIGURE 3 is an enlarged sectional view taken along line 3—3 of FIGURE 2, looking in the direction of the arrows thereon, and illustrating the chain linkage, flexible protective means and guide means;

FIGURE 4 is a cross-sectional view taken along line 4—4 of FIGURE 3 and looking in the direction of the arrows thereon, illustrating the manner in which the guide means is mounted and showing the location of the flexible protective means, and FIGURE 5 is an enlarged partial perspective view of the chain, flexible protective means, guide means and carrier means.

FIGURE 1 illustrates generally the disposition and manner of operation of the conduit system, indicated generally by numeral 10, when the system is used between a fixed source 18 and the movable carriage 19 of an item of equipment. It will be appreciated that the chain means, indicated generally by numeral 11, is comprised of a plurality of links, indicated generally by numeral 12, and that links 12 provide limited articulate movement for chain means 11. Chain means 11 is operatively disposed between source 18 and carriage 19 and defines a re-entrant bend therebetween which is progressively composed of consecutive links 12 as carriage 19 is moved toward and away from source 18, all as will appear more fully hereinafter.

FIGURES 2, 3 and 5 illustrate one form of chain link 12, although it will be appreciated that this invention is not to be limited to this particular link configuration and operation. Each link 12 is comprised of two parallel plates 20 and 21 which are laterally spaced and arranged to operate as a single link 12. As illustrated at FIGURE 5, each plate bears semi-circular extensions 22 and 23 at longitudinal end portions thereof which form like portions for the provision of identical round pin holes 24 formed transversely therethrough. Pin holes 24 in opposite plates 20 and 21 are arranged coaxially and like extensions 22 of plates 20 and 21 are arranged to overlappingly engage like extensions 23 of the next adjoining plates 25 and 26 in positions in which pin holes 24 therein are coaxially aligned. Adjoining plates 20 and 25 are then joined by bolt means 37 passing through holes 24 in opposite extensions in plates 20 and 25, with like bolt means 37 extending through opposite extensions in plates 21 and 26. Bolts 37 are secured by conventional lock type nuts and washers in a manner permitting pivotal movement of consecutive or adjacent links 12.

FIGURES 1 and 2 illustrate the manner in which chain means 11 is articulated. It will be appreciated by those familiar with the art that chain means 11, being formed of a plurality of pin connected links 12, is articulatable along a line defined by the plurality of centers of bolt connected pin holes 24. Thus, line 16 will be termed the axis of articulation of chain means 11, for its defines the disposition of individual links 12 at any point along chain means 11. In this specific embodiment chain means 11 is adapted to be operatively self-supporting between fixed connections at source 18 and carriage 19. This feature is achieved by the specific configuration of the sides of adjoining plates 20 and 25 and 21 and 26. As illustrated at FIGURES 2, 3 and 5, and particularly at FIGURE 2, the straight portions of chain means 11 are maintained in that position by the abutment of consecutive straight parallel sides 29 and 31 extending outwardly from the axis of articulation of adjoining plates 20 and 25 and 21 and 26. As shown in FIGURE 2, adjoining links 12 are pivotally movable relative to one another to a second position in which adjoining angularly arranged sides 30 and 32 extending inwardly from the axis of articulation 16 of consecutive links 12 are brought into abutment whereby the axis of articulation 16 of chain means 11 defines an arc of radius 28. As further illustrated at FIGURE 2, bracket means 40 and 41, located at opposite ends of chain means 11, bear a like side configuration at either side of axis 16. Thus, when brackets 40 and 41 are anchored at a fixed source 18 and carriage 19 respectively, the straight portion of chain means 11 extending from bracket 40 assumes its straight limit position and bracket 40 provides the end support necessary to maintain that portion in its self-supporting straight limit position. The arcuate portion of chain means 11, as shown at FIGURE 2, assumes its minimum radius position at 28 due to the weight of the upper straight portion bearing downwardly thereon effectively at 42. The downward weight at 42 maintains the arcuate portion in a position in which the angular sides of links 11 are in abutment thus forming a support for the straight upper portion at 42. The straight upper portion of chain means 11 is thus supported at the ends thereof by bracket 41 and the arcuate portion at its minimum radius position. It will be evident to those familiar with the art that bracket 40 bears the weight of the lower straight portion, the arcuate portion and substantially one half of the weight of the upper straight portion when the chain means is thus operatively disposed.

Opposite plates of alternate consecutive links 12 are spaced apart and fixedly interconnected in parallelism by transverse web members 50 which are disposed therebetween. Each web member 50 comprises a rectangular plate of selected rectangular dimensions determined by the size and number of conductors to be supported by conduit system 10. The central axes 54 of web members 50 are parallel to the center lines of pin means 17 and are so arranged that they intersect the axis of articulation 16. Thus, the central axes 54 of web members 50 substantially follow the axis of articulation 16.

Positioning holes 55 and 56 in opposite plates 20 and 21 are arranged therein to receive positioning pins 57 and 58 extending from ends 61 and 62, respectively of web member 50. Additionally a stud 51, extending outwardly from each end 61 and 62, is engaged through hole 63 in plates 20 and 21. Each web member 50 is fixedly attached between plates 20 and 21 by engaging and securing nuts 52 over washers 53 and plates 20 and 21 on studs 51. It will be appreciated that web members 50 may be employed between opposite plates of each link 12 and at less frequent intervals over the length of chain means 11, and that this invention is not limited by the particular web arrangement used in the embodiment herein described.

Further, in the embodiment herein described and illustrated, at FIGURES 3 and 5, reinforcing links 65 are engaged with and interconnect pin means 17 of adjoining plates of links 12 which are not interconnected by web members 50. While it has been found that the use of links 65 improves the stability of chain means 11 in supporting larger and heavier conductors, it will be appreciated that other means would produce like stability and that the present invention is not limited by the use in this embodiment of links 65.

Elongated flexible conductor means 14, illustrated at FIGURE 5, is supported over the length of chain means 11 by carrier means 13. In the present embodiment carrier means 13 are defined by the plurality of like round openings 70 formed through web members 50. Each opening 70 is adapted to receive therein at least one conductor 14, and is formed to a size which permits a sliding fit between the inside diameter 72 of hole 70 and the outside diameter 71 of conductor 14. It will be appreciated by those familiar with the art that this invention comprehends a conduit system capable of supporting one and numerous conductors of many types between a fixed source and movable equipment. Thus, it is within the scope and comprehension of this invention to provide a plurality of openings in web members 50 for supporting numerous conductors and to provide a combination of links 12 and web members 50 adapted to accept a plurality of openings and support the numerous conductors. Such additional openings 73 and 74 are illustrated at FIGURE 4.

It is well known that when flexible members are bent to an arcuate position that a longitudinal line of neutral stress is defined between the outer fibres which are under tension and the inner fibres which are compressed. This line is defined as the neutral axis of bending of the member. Additionally, since the bent member is not stressed along this line the original length of the member remains substantially constant therealong. The present invention contemplates that openings 70 are arranged in web members 50 so that the neutral axis of the conductor supported therein substantially coincides with the axis of articulation 16 of chain means 11 when chain means 11 is moved through its range of articulation. Since the neutral axis of conductors 14 is substantially coincident with the central axis thereof the aforementioned condition is substantially met when openings 70, 73 and 74 are located along central axis 54 of each web member 50. Thus, in the present embodiment openings 70, 73 and 74 are located along central axis 54 of web members 50, as illustrated at FIGURE 4.

When conductor 14 is supported in a plurality of like openings 70 located in web members 50, as described above, articulate movement of chain means 11 does not cause a longitudinal movement of conductor 14 relative to openings 70. It will thus be appreciated by those familiar with the art that a conductor 14, so supported, is not subject to chafing and abrasion between its outside surface 71 and the internal surface 72 of carrier hole 70 when the conductor is subjected to bending as the conduit system 10 is articulated.

Further, radius 28 defines the minimum radius at which chain means 11 may be bent. Thus, as hereinbefore described, by selectively forming individual links 12 to a selected configuration, radius 28 may be limited to a predetermined amount. This predetermined radius 28 is arranged to afford safe bending for the most critical conductor to be supported by the conduit system. It will, therefore, be recognized that a conductor supported as described above, will not be subjected to critical bending and will not wear at the areas at which it is supported, when the conduit system is operated in the manner hereinbefore described.

Protective means 15 is adapted to cover at least one open side of chain means 11, and to flexibly follow the articulated movement thereof. The embodiment illustrated at FIGURES 2, 3, 4 and 5 comprises an elongated flexible member 75 supported and guided between opposite plates 20 and 21 of chain means 11 in a position away from conductor 14. Flexible member 75, in this embodiment, is formed of a light gauge mild sheet steel, although it will be appreciated that other flexible materials are compatible with the requirements of member 75. Relevant to this disclosure is the manner of supporting flexible member 75 over the length of chain means 11 so that an inexpensive material, such as mild steel, so supported, will follow the articulate movement of the conduit system without deformation. Member 75 is formed to a width slightly less than the transverse distance between opposite plates of links 12, as shown at FIGURE 4, and is substantially as long as chain means 11. However, it will be understood that the rectilinear dimensions of member 75 may be selectively arranged to cover predetermined portions of each open side of chain means 11 or substantially the entire open side.

Member 75 is supported by opposing portions of outer edge 59 of web members 50 and roller members 80 which define a plurality of laterally elongated openings. In this embodiment, outer edges 33 and 34 of plates 20 and 21 are lapped inwardly upon themselves, and outer edges 35 and 36 of adjoining plates 25 and 26 are lapped outwardly upon themselves, as illustrated at FIGURE 5. Holes 82 are formed through plates 25 and 26 at positions outward of transverse outer faces 59 and 60 of web members 50, on a line defined by the intersection of the central plane of web member 50 and plates 25 and 26. Holes 82 in opposite plates are adapted to receive the ends of cylindrical roller member 80, each member 80 being transversally disposed between said plates and having its opposite ends rotatably engaged in holes 82 therein. Members 80 are retained in their positions between opposite plates of the links bearing web members 50 by the overlapped edges 35 and 36 of said plates which cover at least part of the outer area of holes 82, although it will be understood that members 80 may be otherwise mounted and that the guide means to support member 75 are not so limited to this particular construction.

The elongated openings between members 80 and the outer edges of the several web members 50 are adapted to receive protective member 75 therein in a free sliding manner; member 75 thereby being free to move longitudinally with respect to chain means 11. Member 75 is anchored at one end thereof to chain means 11 by bending end 84, as illustrated at FIGURE 5, around member 80 at the link adjacent one end bracket. Thus, when protective member 75 is supported as described above in chain means 11, articulation of the chain means about its axis of articulation 16 causes a member 75 supported over the open side of chain means 11 to be arcuately bent at a radius equal to radius 28 plus the outward disposition of member 75 away from axis 16. Concomitantly, the larger radius at which member 75 is bent consumes a greater length thereof than is required to cover a corresponding length of chain means 11 when it is in a straight position. Member 75, therefore, moves longitudinally in the supports as straight portions of chain means are moved into a curved position. A member 75 supported at the inner side of chain means 11 is bent at a radius smaller than radius 28 and is subjected to longitudinal movement in its supports due to the shortening of straight portions of chain means 11 as they are moved into a curved position. Movement of member 75 to accommodate the curvature of chain means 11 is assured by leaving one end of member 75 free, while the respective position of member 75 on the open sides of chain means 11 is maintained by fixing end 84 to one end of chain means 11.

It will be understood that both roller member 80 and flexible member 75 are maintained at positions within the physical confines of chain means 11. Chain means 11 may thus be used in conjunction with external members and supports, such as rollers and sprockets, without interference from or with protective means 15.

Protective means 15, thus, shields conductors 14 at selected portions of open sides of chain means 11, and forms a unitary part of the conduit system, independent of external means for support and guidance.

I claim:

1. Articulated chain means comprising a plurality of consecutively joined links, each link comprising at least two parallel laterally spaced opposing plates, adjoining plates of consecutive links being interconnected by hinge means; means to maintain said opposing plates in parallel spaced relationship throughout the length of said chain means, two sides of said chain means being defined by said opposing plates and the other two sides being defined by the open areas therebetween; and shielding means operatively associated with said plurality of links to cover selected portions of said open areas, said shielding means comprising flexible elongated members arranged to extend longitudinally along said chain means and laterally between said opposing plates thereof, and guide means for maintaining said flexible members at predetermined positions between said opposing plates, whereat said members are adapted to flexibly follow the articulate movements of said chain.

2. Articulated chain means comprising a plurality of consecutively joined links, each link comprising at least two parallel laterally spaced opposing plates, adjoining plates of consecutive links being interconnected by hinge means; means to maintain said opposing plates in parallel spaced relationship throughout the length of said chain means, two sides of said chain means being defined by said opposing plates and the other two sides being defined by the open areas therebetween; and shielding means operatively associated with said plurality of links to cover selected portions of said open areas, said shielding means comprising a flexible elongated member arranged to extend longitudinaly along said chain means and laterally between said opposing plates thereof whereat said member is adapted to flexibly follow said articulate movement, guide means extending between and mounted on said plates of selected links for maintaining said flexible member at predetermined positions between said opposing plates, said flexible member being movable longitudinally in said guide means, and anchoring means for limiting longitudinal movement of said flexible member relative to the several links, said shielding means being disposed within the physical confines of the several links.

3. Articulated chain means comprising a plurality of consecutively joined links, each link comprising at least two parallel laterally spaced opposing plates, adjoining plates of consecutive links being interconnected by hinge means; means to maintain said opposing plates in parallel spaced relationship throughout the length of said chain means, two sides of said chain means being defined by said opposing plates and the other two sides being defined by the open areas therebetween; and shielding means operatively associated with said plurality of links to cover selected portions of said open areas, said shielding means operatively associated with said plurality of links to cover selected portions of said open areas, said shielding means comprising flexible elongated members arranged to extend longitudinally along said chain means and laterally between said opposing plates thereof, whereat said members are adapted to flexibly follow said articulate movement, and guide means for maintaining said flexible members at predetermined positions between said opposing plates, comprising a plurality of laterally arranged guide members extending normally between and mounted on opposing plates of selected links, said guide members being arranged to define a plurality of transversely elongated openings in which a said flexible member is slidably mounted, said openings for each said member being disposed in like positions at said selected links, each said flexible member being anchored at one end thereof to a selected guide member to position said flexible member longitudinally, said shielding means being disposed within the physical confines of the several links.

4. In articulated chain means for supporting movable flexible conductors comprising a plurality of serially joined links, each link comprising at least two spaced plates arranged in opposing parallel relationship and which are pivotally interconnected with adjoining plates, spacing means to maintain said relationship throughout said chain means, and conductor carrier means associated with said spacing means to support at least one longitudinally arranged conductor at predetermined positions intermediate said opposing plates, two sides of said chain means being defined by said opposing plates and the other two sides being defined by the open areas therebetween; protective means operatively associated with said chain means to cover selected portions of the open sides thereof, comprising flexible elongated planar members arranged to extend longitudinally along said chain means between said opposing plates in positions generally normal thereto, and guide means for maintaining said flexible members at predetermined positions intermediate a supported conductor and the corresponding outer edges of opposing plates, whereat said flexible members are adapted to flexibly follow said articulate movement and whereby said supported conductors may be selectively shielded.

5. In articulated chain means for supporting movable flexible conductors comprising a plurality of serially joined links, each link comprising at least two spaced plates arranged in opposing parallel relationship and which are pivotally interconnected with adjoining plates, spacing means to maintain said relationship throughout said chain means, and conductor carrier means associated with said spacing means to support at least one longitudinally arranged conductor at predetermined positions intermediate said opposing plates, two sides of said chain means being defined by said opposing plates and the other two sides being defined by the open areas therebetween: protective means disposed between and supported by the opposing plates of said chain means to cover selected portions of the open sides thereof, comprising at least one flexible elongated planar member arranged to extend longitudinally along said chain means between said opposing plates in a position generally normal thereto, guide means extending normally between and mounted on opposing plates of selected links for maintaining said flexible member at predetermined positions intermediate a supported conductor and the corresponding outer edges of opposing plates, said member being movable longitudinally in said guide means, and anchoring means for limiting longitudinal movement of said flexible member relative to said chain means, said member being adapted to flexibility follow said articulate movement of the chain means, whereby supported conductors may be selectively shielded.

6. In articulated chain means for supporting movable flexible conductors comprising a plurality of serially joined links, each link comprising at least two spaced plates arranged in opposing parallel relationship and which are pivotally interconnected with adjoining plates, spacing means to maintain said relationship throughout said chain means, and conductor carrier means associated with said spacing means to support at least one longitudinally arranged conductor at predetermined positions intermediate said opposing plates, two sides of said chain means being defined by said opposing plates and the other two sides being defined by the open areas therebetween; protective means disposed between and supported by the opposing plates of said chain means to cover selected portions of the open sides thereof, comprising at least one flexible elongated planar member arranged to extend longitudinally along said chain means between said opposing plates in a position generally normal thereto, and guide means to maintain each said flexible member at a predetermined position intermediate said supported conductor and the corresponding outer edges of said opposing plates, said guide means comprising a plurality of serially arranged openings extending laterally between opposing plates of selected links, each said flexible member being slidably mounted in said plurality of openings, each said flexible member being anchored at one end thereof to a selected guide member, whereby said flexible member is adapted to flexibly follow said articulate movement and to shield said conductor, said protective means being disposed within the confines of said chain means.

7. An articulated conduit system for supporting elongated flexible conductors between connections at spaced elements, at least one of said spaced elements being movable, comprising: articulated chain means disposed between and anchored at said spaced elements, said chain means comprising a plurality of serially joined links, each of said links comprising at least two spaced plates arranged in opposing parallel relationship, adjoining plates of the several links being interconnected by hinging means, the several hinging means being arranged in like positions along said chain means and defining the longitudinal axis of articulation thereof; spacing means to maintain the parallel spaced relationship of opposing plates throughout the length of said chain means comprising a plurality of web members, one said web member extending normally between opposing plates of selected links and being rigidly interconnected therewith, said opposing plates defining two sides of said chain means and the other two sides being defined by the open areas therebetween; attaching means to interconnect said chain means with said spaced elements, there being one said attaching means hingedly joined to the terminal link at each end of said chain means, each said attaching means being adapted for rigid mounting at a said spaced element; conductor carrier means operatively associated with said plurality of web members to support and guide one and more longitudinally arranged conductors at positions in which their neutral axes of bending are maintained substantially coincident with said axis of articulation; and protective means operatively associated with said chain means to cover selected portions of the open sides thereof, comprising flexible elongated planar members arranged to extend longitudinally along said chain means between said opposing plates in positions generally normal to and adapted to flexibility follow said articulate movement, and guide means to maintain said flexible members at predetermined positions away from said supported conductors, comprising a plurality of spaced elongated roller members cooperating with selected top and bottom portions of said web members to form therewith a plurality of transversely elongated openings in which said flexible members are supported, there being one said roller member associated with each said selected portion, each said roller member being rotatably mounted between said opposing plates in a position spaced outwardly of an associated said selected portion, said flexible member being slidably mounted in said elongated openings and anchored at one end thereof to a selected roller member, whereby supported conductors are shielded thereby.

8. An articulated conduit system for supporting elongated flexible conductors between connections at spaced members, at least one of said spaced members being movable, comprising: articulatable chain means disposed between and anchored at said spaced members, said chain means comprising a plurality of serially joined links, each of said links comprising at least two parallel opposing laterally spaced plates, adjoining plates of the several links being interconnected by hinging means, the several hinging means being arranged in like positions along said chain means and defining the longitudinal axis of articulation thereof; spacing means to maintain the parallel spaced relationship of opposing plates throughout the length of said chain means comprising a plurality of web members having parallel side portions and parallel top and bottom portions, there being one said member disposed between opposing plates of selected links and rigidly interconnected therewith at said parallel side portions, said opposing plates defining two sides of said chain means, the other two sides being defined by the open areas therebetween, attaching means to interconnect said chain means with said spaced members, one portion of each said attaching means being hingedly joined to the terminal link at one of said ends of said chain means, and being adapted for rigid connection to one of said spaced members at another portion thereof, there being one said attaching means at each end of said chain means; conductor carrier means operatively associated with said plurality of web members to support and guide one and more longitudinally arranged conductors in positions in which their neutral axes of bending are maintained substantially coincident with said axis of articulation; and protective means supported by and disposed within the opposing plates of said chain to cover selected portions of the open sides thereof, comprising flexible elongated planar members arranged thereto, and guide means extending normally between and mounted on said opposing plates to maintain said flexible members at predetermined positions intermediate a supported conductor and the corresponding outer edges of opposing plates, whereat said flexible members are adapted to flexibility follow said articulate movement, and shield said supported conductor.

References Cited

UNITED STATES PATENTS

| | | | |
|---|---|---|---|
| 2,864,907 | 12/1958 | Waninger | 59—78.1 |
| 2,975,807 | 3/1961 | Waninger | 138—108 |
| 3,098,349 | 7/1963 | Waninger | 59—78.1 |
| 3,161,205 | 12/1964 | Merker | 191—12 X |

LAVERNE D. GEIGER, *Primary Examiner.*

B. E. KILE, *Assistant Examiner.*

Disclaimer 3,330,105.—*Charles H. Weber*, Mayville, Wis. PROTECTIVE DEVICE FOR FLEXIBLE CONDUCTORS. Patent dated July 11, 1967. Disclaimer filed Apr. 6, 1970, by the assignee, *Maysteel Products Corp.*
Hereby enters this disclaimer to claims 1 to 8, inclusive, of said patent.
[*Official Gazette May 26, 1970.*]